(12) United States Patent
Acker, Jr.

(10) Patent No.: US 7,578,539 B1
(45) Date of Patent: Aug. 25, 2009

(54) APPARATUS FOR DECREASING OPENING VELOCITIES OF SUPPORT PILLARS

(75) Inventor: Hermann L. Acker, Jr., Arlington, TX (US)

(73) Assignee: Roland Curtains USA, Inc., Arlington, TX (US)

( * ) Notice: Subject to any disclaimer, the term of this patent is extended or adjusted under 35 U.S.C. 154(b) by 0 days.

(21) Appl. No.: 12/115,124

(22) Filed: May 5, 2008

(51) Int. Cl.
  *B60P 7/00* (2006.01)
(52) U.S. Cl. .................. 296/100.17; 296/105
(58) Field of Classification Search ............ 296/100.11, 296/100.12, 100.1, 104
  See application file for complete search history.

(56) References Cited

U.S. PATENT DOCUMENTS

| 4,265,577 | A |   | 5/1981  | Loomis    |         |
|-----------|---|---|---------|-----------|---------|
| 4,408,793 | A |   | 10/1983 | Broadbent |         |
| 4,545,611 | A |   | 10/1985 | Broadbent |         |
| 4,861,094 | A |   | 8/1989  | Krueger   |         |
| 5,524,953 | A | * | 6/1996  | Shaer     | 296/100.12 |
| 5,829,823 | A |   | 11/1998 | Swenson   |         |
| 6,502,890 | B1|   | 1/2003  | Fliege    |         |
| 7,249,796 | B2| * | 7/2007  | Henning   | 296/105 |
| 2003/0067186 | A1 | * | 4/2003 | Cramaro | 296/105 |
| 2005/0231004 | A1 |   | 10/2005 | Remmel |         |
| 2007/0035153 | A1 | * | 2/2007 | Henning | 296/105 |

OTHER PUBLICATIONS 2 pages from a website showing dampers, by AVM Industries LLC.
2 page flyer showing a Rolaload—published Apr. 18, 2006, by Roland Curtains USA Inc.

* cited by examiner

*Primary Examiner*—Lori L Lyjak
(74) *Attorney, Agent, or Firm*—Sturm & Fix LLP (57) ABSTRACT

The invention relates generally to an apparatus for use with curtain side trailers, including a pillar with a hydraulic dampening device and two members, and providing a way for the pillar to be locked and released from lateral movement along a railing or framework. The invention is generally used as an intermediary support for the curtain and the roof, and extends from the trailer bed to the roof. Since the pillars can move laterally along the railing or framework once released and opened, the width for loading and unloading is increased. The dampening device of present invention helps with safety issues of prior inventions by decreasing the velocity of the opening pillar.

6 Claims, 7 Drawing Sheets

APPARATUS FOR DECREASING OPENING VELOCITIES OF SUPPORT PILLARS

CROSS REFERENCE TO RELATED APPLICATIONS

Not applicable

BACKGROUND OF THE INVENTION

1. Field of the Invention

The present invention relates generally to a post or pillar with a hydraulic dampening device to be used with curtain sided trailers. It extends between the bed of the vehicle and railing or framework near the roof, usually as intermediary support between pillars located at the corners of the trailer bed. When it is in its installed position, it holds the curtain in place and helps to support the load of the roof. Once released, it slides along an upper railing to increase the loading and unloading width.

2. Description of the Prior Art

Currently, there are existing pillars designed to increase the loading and unloading width. They are generally connected from the trailer bed to a rail near the roof, and slide along or pivot away from the railing. Examples of these inventions are shown in U.S. Pat. No. 4,861,094 to Krueger and 2005/0231004 to Remmel respectively, which are incorporated herein by reference.

One problem with these inventions is that when the pillar is released and opens, there is nothing to control the velocity of the opening pillar, and can therefore be a safety hazard.

Another type of pillar exists to increase width of loading and unloading for curtain sided vehicles. This example is U.S. Pat. No. 4,408,793 to Broadbent, which is also incorporated herein by reference. Instead of detaching from the trailer bed, these pillars swing outboard after releasing bolts at the top and bottom of the pillar. This invention does not appear to have the high velocities associated with the opening pillars in previous examples, but it also does not increase the loading and unloading width as significantly as the pillars that can move laterally along the railing or framework.

Accordingly there is a need for an alternative device to overcome the shortcomings of the prior art discussed above.

BRIEF SUMMARY OF THE INVENTION

The present invention relates generally to a post or pillar with a damper cylinder to be used with curtain sided trailers. It extends between the roof and the bed of the vehicle, usually as intermediary support between pillars located at the corners of the trailer bed. When it is in its installed position, it holds the curtain in place and helps to support the load of the roof. Once released, it slides along an upper railing to increase the loading and unloading width.

The present invention is unlike prior art, in that it includes a hydraulic dampening device to decrease the velocity of the outer member of the pillar when it is opened.

An object of the present invention is to provide a method and apparatus to facilitate widening the loading and unloading width for curtain side trailers.

Another object of the present invention is to provide a way to decrease the velocity of the opening pillar after it is released from a locked and installed position to aid in making it safer for the operator of the pillar.

Other objects, advantages, and novel features of the present invention will become apparent from the following detailed description of the invention when considered in conjunction with the accompanying drawings.

DESCRIPTION OF THE PREFERRED EMBODIMENTS

Figures 1, 2:
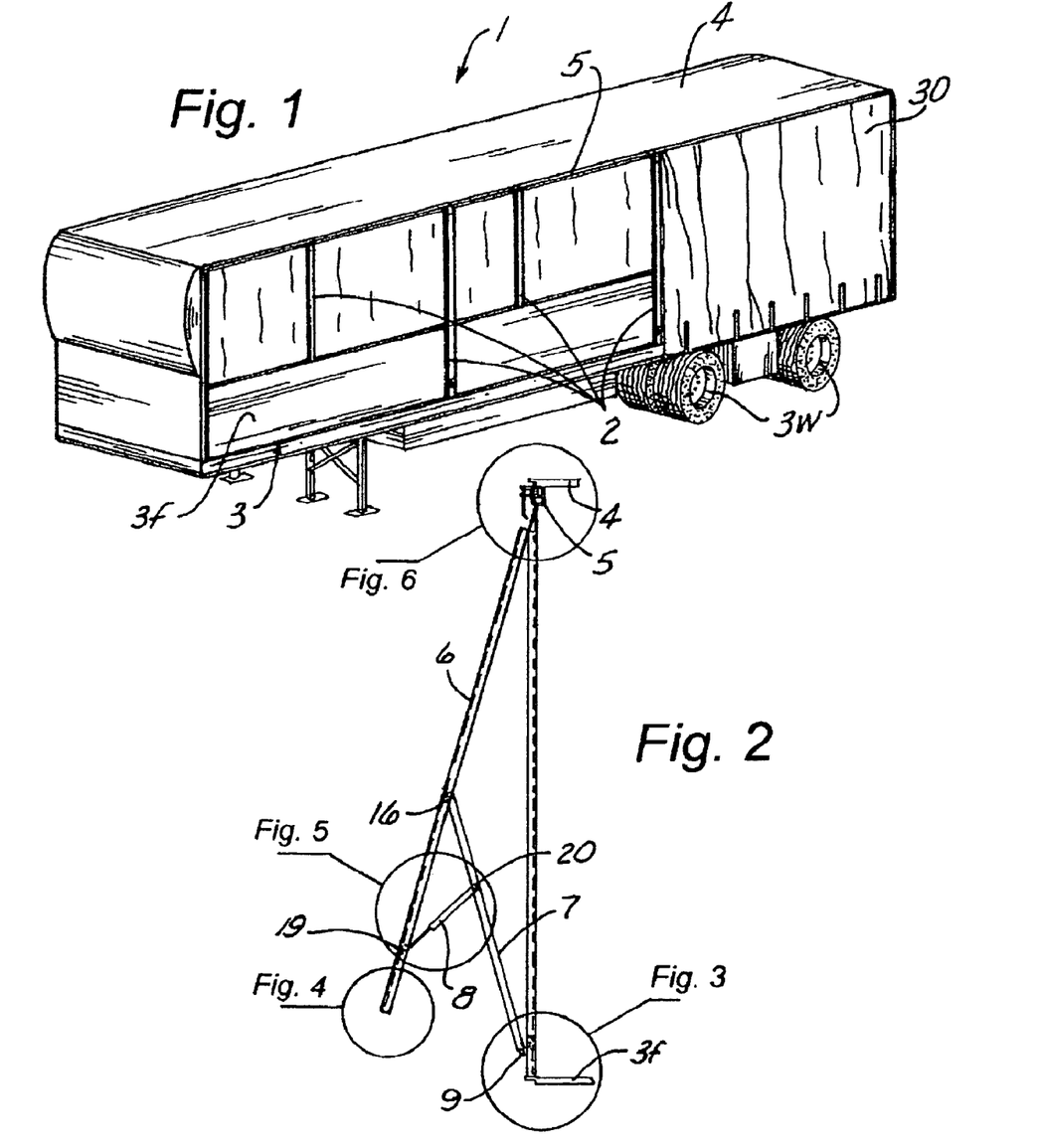
FIG. 1 is a perspective view of the present invention, showing it located on a trailer in its installed upright position.
FIG. 2 is a side view of the pillar, showing the pillar in its open position and the locations of FIGS. 3, 4, 5, and 6.

Referring now to the drawings wherein like numerals designate identical or corresponding parts throughout the several views, FIG. 1 shows a curtain side semi trailer or truck body 1 with intermediary pillars 2 that are connected from the floor 3f to the trailer roof 4. The pillars 2 are connected at their upper end to a rail or upper frame 5 and at their lower end to lower frame 3.

Referring now to FIG. 2, a pillar 2 and an upper railing or upper frame 5 is disposed between the floor 3f and the trailer roof 4 constructed in accordance with the present invention. The pillar 2 consists of the outer member or first post member 6, preferably aluminum; the inner member or second post member 7, preferably steel; a dampening cylinder 8, which can be of a type called "standard dampers" available from AVL Industries, LLC as shown in the accompanying invention submission disclosure (IDS) and which IDS prior art is incorporated herein by reference in its entirety; and the locator pin or protuberance 9 located on the end of the inner member or second post member 7. The outer member or first post member 6 has the inner member or second post member 7 pivotally attached thereto at pivotal axis 16 shown in FIG. 2. The dampening cylinder 8 has a first end pivotally attached at axis 19 to the outer member or first post member 6 and a second end pivotally attached at axis 20 to the inner member or second post member 7 for preventing the first and second members 6 and 7 from pivoting from the first to the second pivotal position too quickly.

Figure 3:
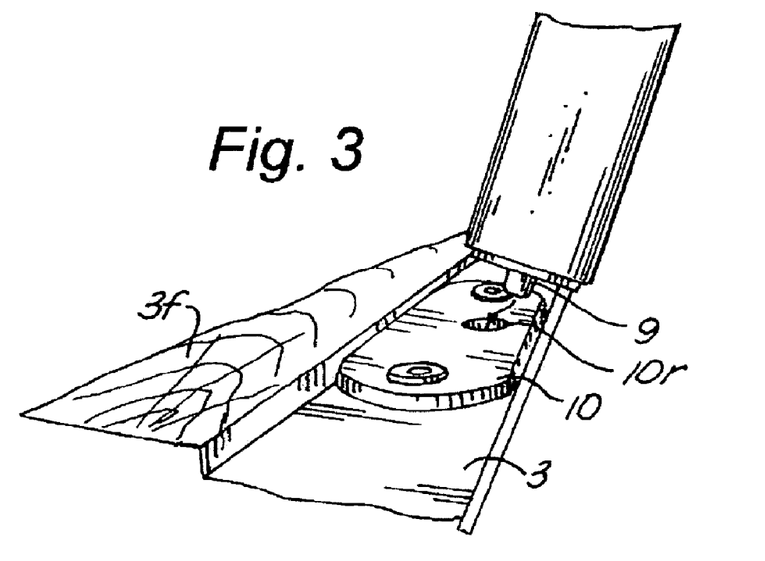
FIG. 3 is a perspective view of the bottom end of the inner member of the pillar, showing how the locator pin on the end of the pillar would fit into the locator plate.

Referring now to FIG. 3, the locator pin or protuberance 9 can be inserted into the recess 10r of the locator plate 10, which is located on the edge of the floor 3f. The locator pin or protuberance 9 of each pillar 2 must be engaged in a recess 10r of a locator plate 10 when the vehicle is in motion.

Figure 4:
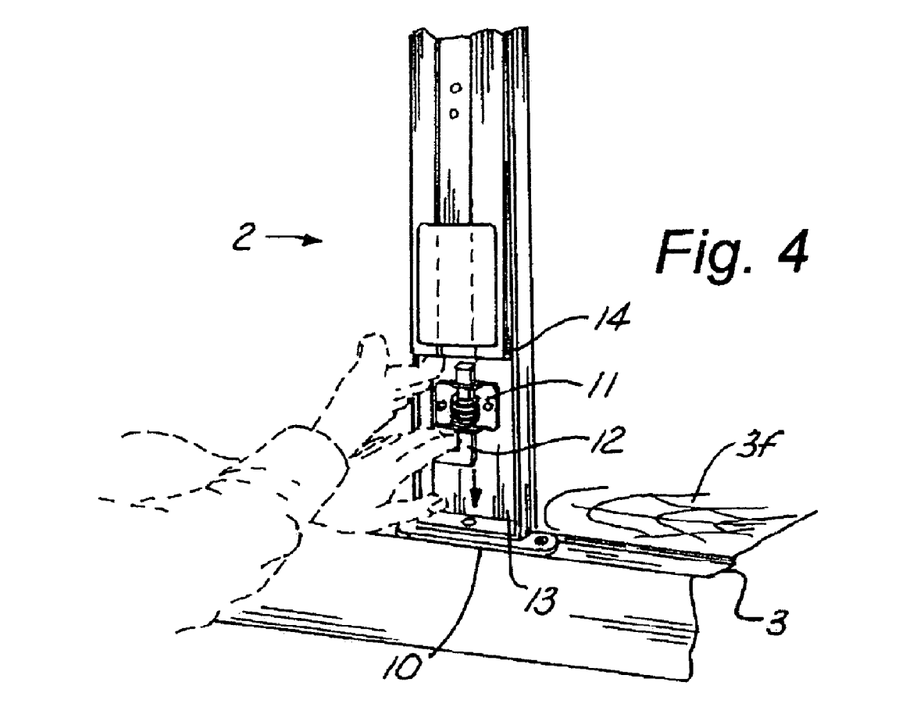
FIG. 4 is a perspective view of the bottom of the installed but unlocked pillar, showing how the locking handle can be pushed down to release the lock mechanism of the pillar. It also shows how the outer member of the pillar, preferably aluminum, can be pulled outward.

Referring now to FIG. 4, the locking mechanism (11, 12, 6a, and 6b) attached to the bottom portion of the inner member or second post member 13 can be released by pushing downward on the locking handle 12. The bottom end of the outer member or first post member 14 can then be pulled outward with minimal pressure to prompt the outward movement of the pillar 2. It is noted that FIG. 4 actually shows the bottom of the pillar 2 in the closed position and not in the open position shown in FIG. 2, despite the reference back to FIG. 4 in FIG. 2. FIG. 4 is a perspective view of the bottom of the installed but unlocked pillar 2, showing how the locking handle 12 of the locking mechanism (11, 12, 6a, and 6b) can be pushed down to unlock the pillar 2. It also shows how the outer member of the pillar or first post member 6, preferably aluminum, can be pulled outward.

Figures 4A, 4B:
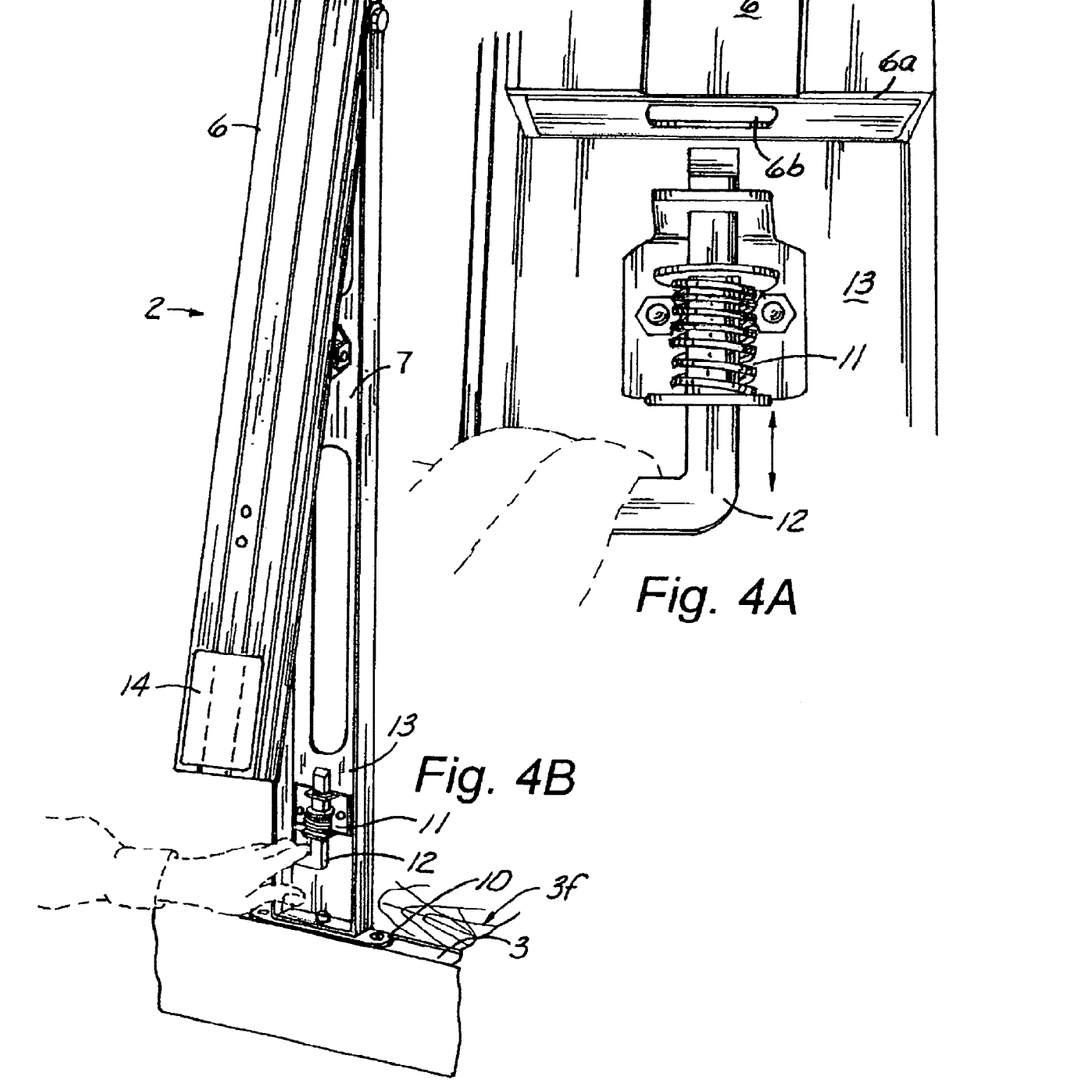
FIG. 4A is an enlarged perspective view of the locking handle and locking mechanism, showing how the locking handle can be pushed down to release the locking mechanism of the pillar.
FIG. 4B is a perspective view of the locking mechanism, locking handle and the pillar, showing how the outer member of the pillar can swing outward.

FIG. 4A shows how the locking mechanism (11, 12, 6a, and 6b) will unlock when the locking handle 12 is pulled downwardly. FIG. 4A is an enlarged perspective view of the locking handle 12 and the second part of the locking mechanism 11, showing how the locking handle 12 can be pushed down to unlock the pillar 2. As the pillar 2 is unlocked, the top end of the locking handle 12 disengages from the opening 6b of the plate 6a with an opening 6b. When the pillar 2 is locked, the top end of the locking handle 12 is engaged in the opening 6b of the plate 6a with an opening 6b.

FIG. 4B shows the pillar 2 in its open position, wherein the bottom end of the outer member or first post member 14 has been moved outwardly.

Referring now to FIG. 5, the pillar 2 is again shown in its open position, as well as its installed position (in dashed lines). The rail upper frame 5 is shown as well as the upper locator or connecting member 15, both of which will be shown and described in more detail below. The outer member or first post member 6 and the inner member or second post member 7 are pivotally attached along a second substantially horizontal axis 16.

Figures 5, 5A:
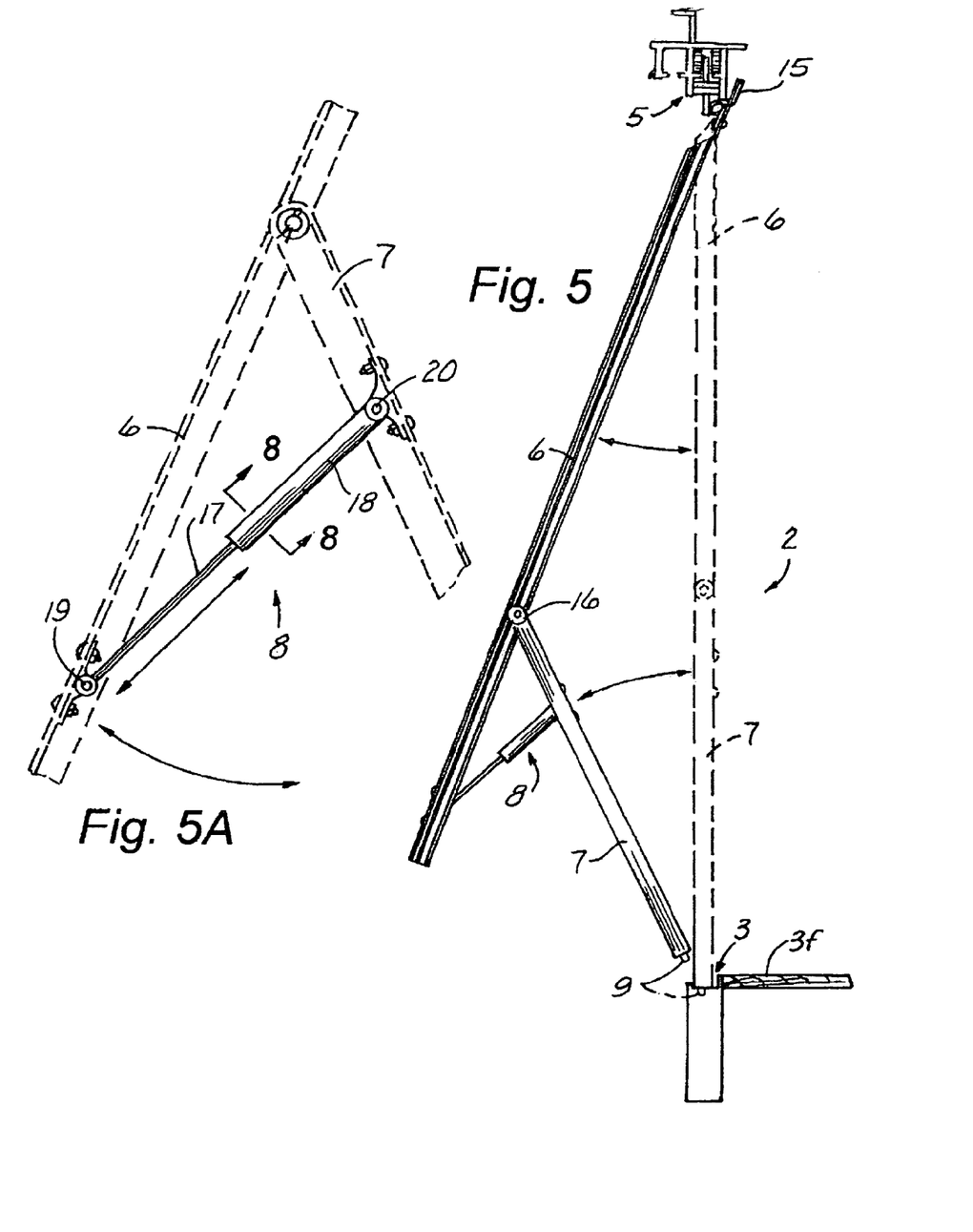
FIG. 5 is a side view of the present invention, showing the pillar in its open position in solid lines and the installed position in dashed lines. It shows how both members of the pillar move outward or inward as the outer member is moved outward or inward, respectively.
FIG. 5A is an enlarged side view, showing how the damper cylinder is attached with hinges to each of the members of the pillar; how the outer member of the pillar swings outward or inward; and how the rod of the damper cylinder moves in relation to the tube of the damper cylinder.

Referring now to FIG. 5A, the dampening cylinder 8 has a first end pivotally attached 19 to the outer member or first post member 6 and a second end pivotally attached 20 to the second post member 7 for preventing the first and second members 6 and 7 from pivoting from the first to the second pivotal position too quickly. FIG. 5A is an enlarged side view, showing how the dampening cylinder 8 is attached pivotally to each of the members 6 and 7 of the pillar; how the outer member or first post member 6 swings outward or inward; and how the rod 17 of the dampening cylinder 8 moves in relation to the tube 18 of the dampening cylinder 8.

Figure 6:
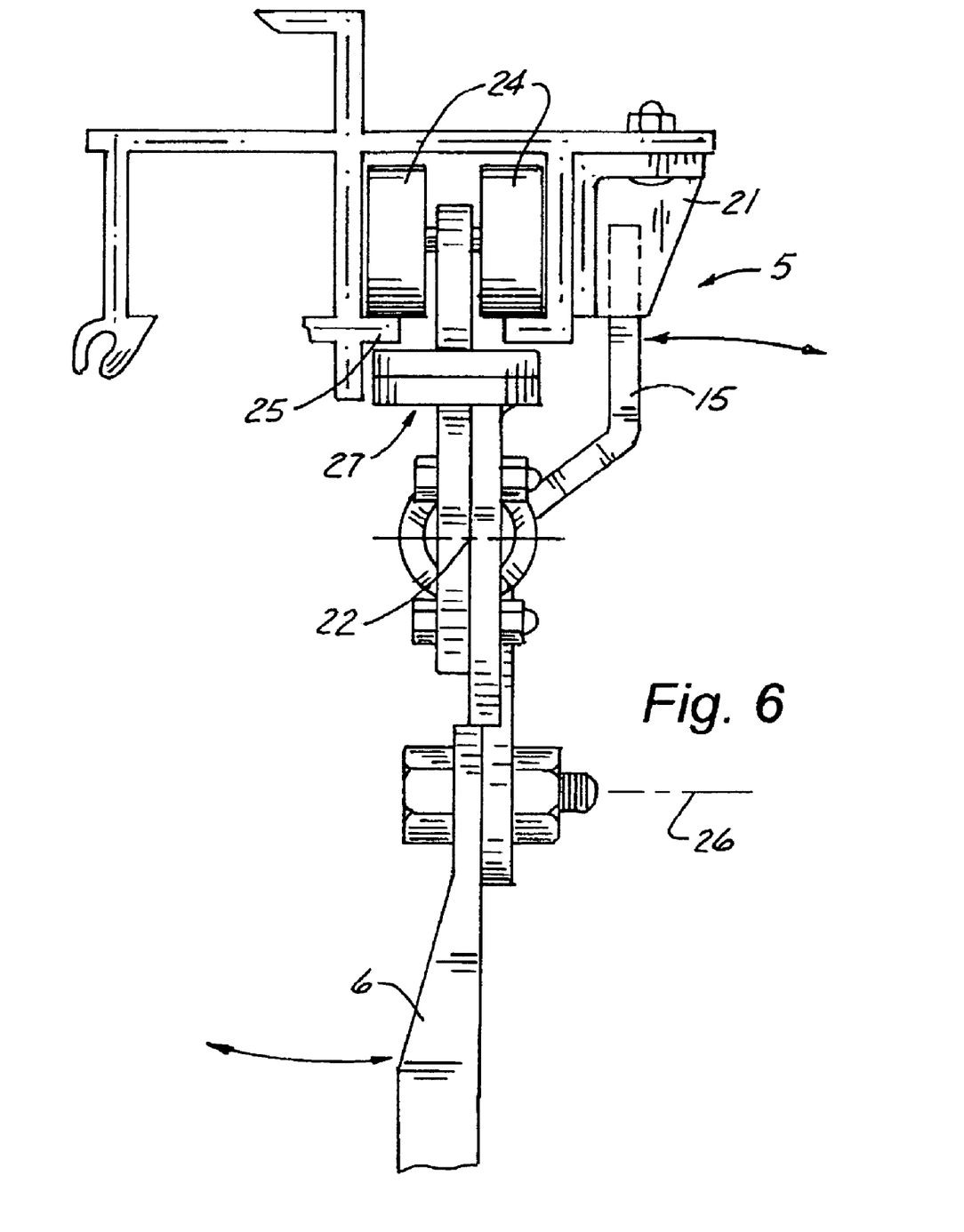
FIG. 6 is a side view of the top portion of the pillar and the railing or framework, showing how as the outer member of the pillar swings outward, the upper locator pivots and disengages from the pocket. Conversely, as the outer member swings inward, the upper locator pivots and engages into the pocket. The pivot point is located in the center of the centerline shown.

After the pillar 2 is opened, the outer member or first post member 6 is brought back to meet with the bottom of the inner member or second post member 13. Referring now to FIG. 6, the upper rail or upper frame 5 comprises an upper locator or connecting member 15 which is engaged in a pocket or spaced apart flanges 21. As the outer member or first post member 6 and inner member or second post member 7 together are moved outward away from the vehicle, the upper locator or connecting member 15 disengages from the pocket or spaced apart flanges 21. The pivot axis or first substantially horizontal axis 22 is at the lower end of the upper locator or connecting member 15.

FIG. 6 is a side view of the top portion of the outer member or first post member 6 of pillar 2 showing how outer member or first post member 6 is attached to the trolley wheel assembly 27 and the railing or upper frame 5, showing how as the outer member or first post member 6 of the pillar 2 swings outwardly, the upper locator or connecting member 15 pivots and disengages from the pocket or pair of spaced apart flanges 21. Conversely, as the outer member or first post member 6 swings inwardly, the upper locator or connecting member 15 pivots and engages into the pocket or pair of spaced apart flanges 21. The pivot axis or first substantially horizontal axis 22 is located in the center of the centerline shown. A second pivotal axis 26 allows the outer member or first post member 6 to pivot from side to side if desired.

Figure 6A:
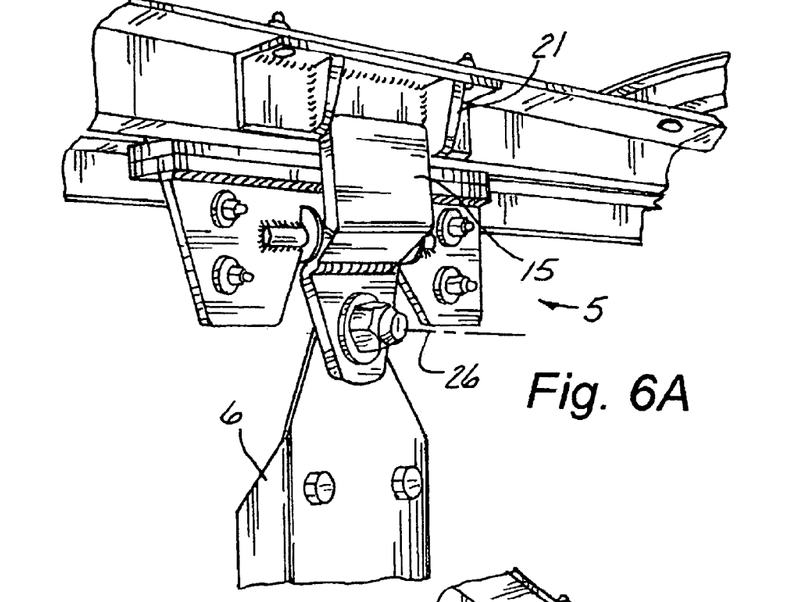
FIG. 6A is an enlarged partial perspective view of the upper portion of the present invention, including the top portion of the pillar and the railing or framework, showing the upper locator engaged in the pocket. This position allows for no lateral movement of the pillar.
Figure 6B:
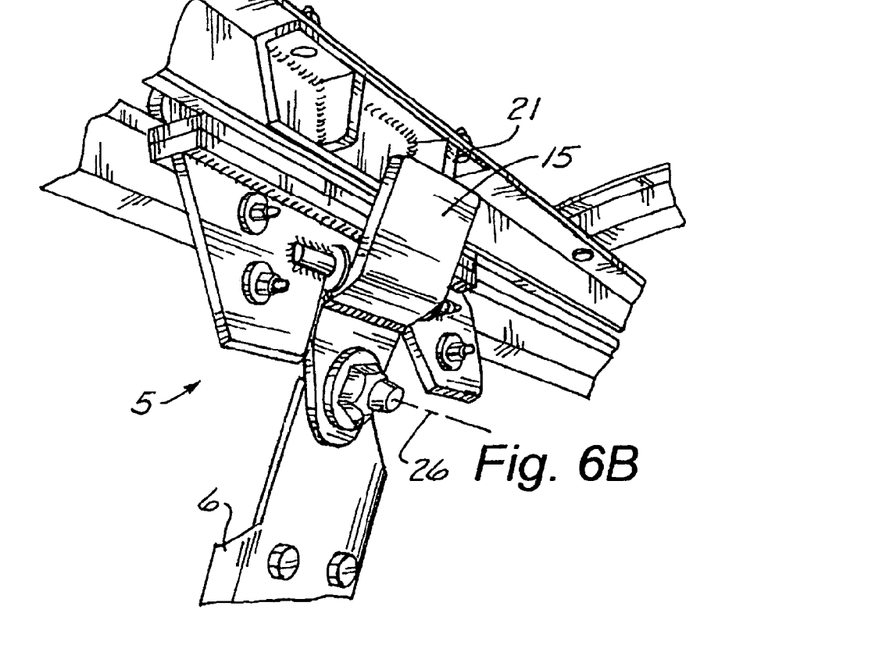
FIG. 6B is an enlarged partial perspective view of the upper portion of the present invention, including the top portion of the pillar and the railing or framework, showing the upper locator disengaged from the pocket. This allows for lateral movement of the pillar along the railing or framework.
Figure 6C:
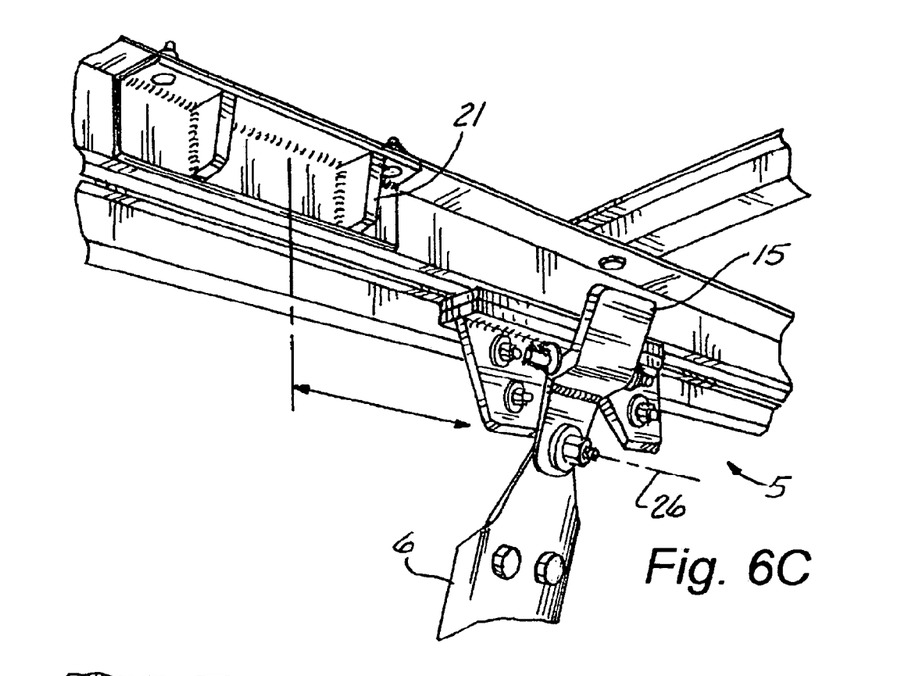
FIG. 6C is an enlarged partial perspective view of the upper portion of the present invention, including the top portion of the pillar and the railing or framework, showing how the upper locator is moved away from the pocket and how it can slide along the railing or framework.

FIG. 6A is an enlarged partial perspective view of the upper portion of the present invention, including the top portion of the outer member or first post member 6 of pillar 2 and the upper railing or upper frame 5, showing the upper locator or connecting member 15 engaged in the pocket or pair of spaced apart flanges 21. This position allows for no lateral movement of the pillar 2. FIG. 6B is an enlarged partial perspective view of the upper portion of the present invention, including the top portion of the outer member or first post member 6 of pillar 2 and the railing or upper frame 5, showing the upper locator or connecting member 15 disengaged from the pocket or pair of spaced apart flanges 21. This allows for lateral movement of the pillar 2 along the railing or upper frame 5. FIG. 6C is an enlarged partial perspective view of the upper portion of the present invention, including the top portion of the outer member or first post member 6 of pillar 2 and the upper railing or upper frame 5, showing how the upper locator or connecting member 15 is moved away from the pocket or pair of spaced apart flanges 21 and how it can slide along the upper railing or upper frame 5.

Figures 7, 8:
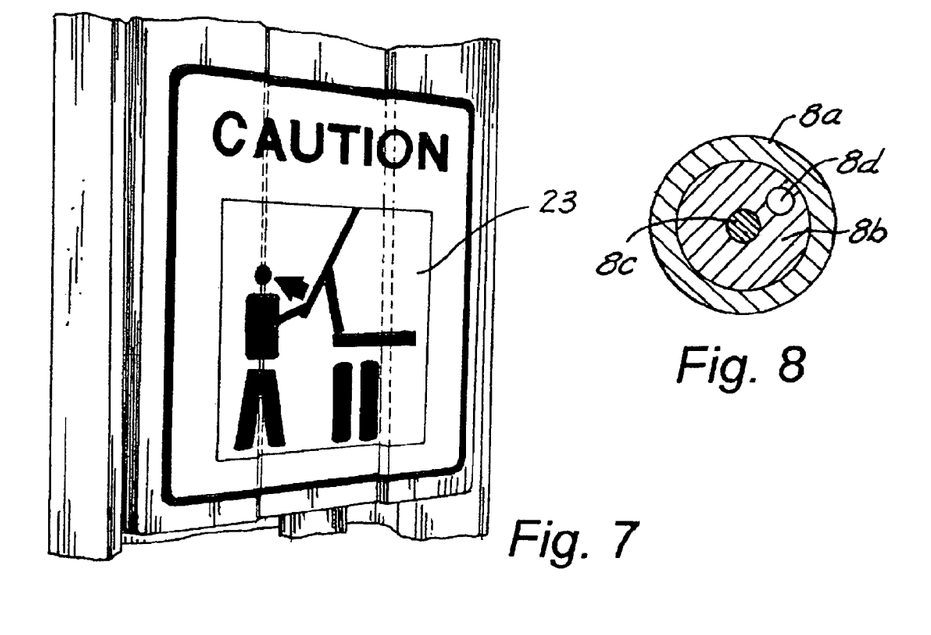
FIG. 7 is an enlarged partial perspective view of the warning decal on the face of the pillar. Even with the lower velocities that the hydraulic dampening device creates, opening the pillar can still cause injury if standing too close.
FIG. 8 is a cross-sectional view taken along line 8-8 in FIG. 5A showing a cylinder wall, a piston with an orifice in it and a piston rod.

Referring now to FIG. 7, a warning decal 23 is located on the face of the pillar 2, instructing users to not stand too closely to the pillar 2 as it is opening.

FIG. 8 shows a cross-sectional view taken along line 8-8 in FIG. 5A showing a typical dampening cylinder wall 8a, a piston 8b with an orifice 8d in it and a piston rod 8c. The cylinder 8a is filled with hydraulic oil, not shown, and the hydraulic oil can move from one side of the piston 8b to the other, as is a preferred way the dampening cylinder 8 slows the velocity of pivoting movement of the outer and inner or first and second members 6 & 7 from the FIG. 1 to the FIG. 2 position thereof.

In operation, the pillars 2 are initially in the position shown in FIG. 1 to hold the curtains 30 in place while moving the trailer 1 over a road to deliver goods to be transported. When it is desired to load or unload such goods to or from the trailer 1, one or more of the pillars 2 are removed by (1) moving the locking handle 12 down as shown in FIG. 4B and (2) pivoting the outer member or first post member 6 out to the position shown in FIG. 2. At such time, the dampening cylinder 8 will prevent the outer member or first post member 6 from moving out too fast.

The pillar 2 is pivoted outwardly from the position shown in FIG. 6A to the position shown in FIG. 6B about pivotal axis or the first substantially horizontal axis 22 of FIG. 6. The pillar 2 can then be rolled using rollers 24 that roll on track 25 of FIG. 6. Of course the locator pin or protuberance 9 is moved to the FIG. 5 position before the pillar 2 is rolled on the track 25 of upper railing or upper frame 5. Then the goods can be loaded or unloaded on that portion of the trailer 1 where the pillar 2 was removed. Then the process just outlined above is reversed when it is desired to put the pillar 2 back in place to hold the curtain 30 in place while the trailer 1 is being transported down the road.

Accordingly it will be appreciated that the present invention does indeed accomplish the aforementioned objects. Obviously many modifications and variations of the present invention are possible in light of the above teachings. It is therefore to be understood that, within the scope of the appended claims, the invention may be practiced otherwise than as specifically described.

I claim:

1. An apparatus for holding transport curtains in place comprising:
   a lower frame;
   wheels operatively attached to the frame for permitting the lower frame to move over a surface of a road;
   a floor attached to the lower frame;
   an upper frame operatively attached to the lower frame;
   a track disposed on the upper frame;
   a roof operatively attached to the upper frame;
   a curtain operatively attached to the upper and lower frame for selectively providing a barrier to access to the floor in a first position of the curtain and providing access to the floor in another position of the curtain;
   a trolley wheel assembly disposed on the track of the upper frame to permit the trolley wheel assembly to move along the track at times;
   a first post member pivotally attached at the top thereof along a first substantially horizontal axis to the trolley wheel assembly, said first post having a bottom end;
   a second post member pivotally attached to the first post member along a second substantially horizontal axis at a first end of the second post member, the second post member having a second end;
   the second post member having a first pivotal position in alignment with the first post member and a second pivotal position pivoted away from and therefore not in alignment with the first post member;
   a dampening cylinder having a first end pivotally attached to the first post member and a second end pivotally attached to the second post member for preventing the first and second members from pivoting from the first to the second pivotal position too quickly; and
   a locking mechanism operatively attached to at least one of the first and second post members for selectively holding the first and second post members in the first position thereof.

2. The apparatus of claim 1 wherein the first post member is also operatively pivotally attached to the trolley wheel assembly along a third axis which is transverse to the first substantially horizontal axis whereby the first post member can be moved from side to side about the third axis in addition to being moved towards or away from the floor about the second pivotal axis.

3. The apparatus of claim 1 wherein the locking mechanism is slideably attached to the first post member near the bottom thereof, said locking mechanism including a member biased to a locking position in engagement with the second post member and moveable to an unlocked position that is not in engagement with the second post member thereby permitting the first and second post members to pivot with respect to each other.

4. The apparatus of claim 1 including a pair of spaced apart flanges connected to the upper track and a connecting member attached to the top of the first post member, the connecting member having a first position disposed between the spaced apart flanges when the second post member is in the first pivotal position thereof to prevent the trolley wheel assembly from moving along the track and the connecting member having a second position displaced from between the spaced apart flanges when the second post member is in the second pivotal position pivoted away from and therefore not in alignment with the first post member, whereby when the connecting member is in the second position thereof the trolley wheel assembly can be moved along the track.

5. The apparatus of claim 1 wherein the connecting member of the first post member is pivotally attached to the first post member along a pivotal axis which is transversely disposed with respect to the first substantially horizontal axis.

6. The apparatus of claim 1 including a protuberance on the bottom of the second post member disposed in a recess in a portion of the lower frame in the first position of the second post member.

\* \* \* \* \*